Figure 1:
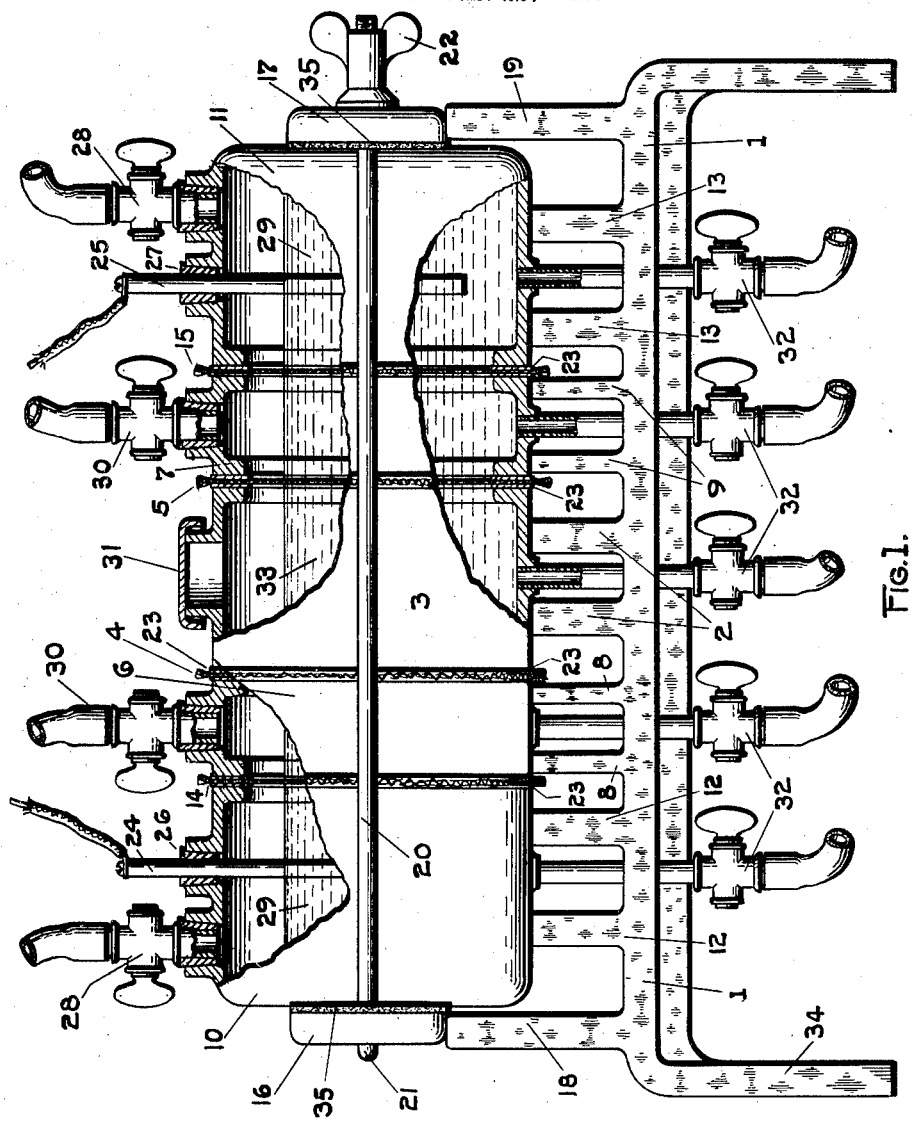

July 21 1925.

V. A. LAPENTA

ELECTROENDOSMOSIS METHOD AND APPARATUS

Filed Jan. 22, 1925

1,546,908

INVENTOR
VINCENT A. LAPENTA
BY
Owen H Spencer
HIS ATTORNEY

Patented July 21, 1925.

1,546,908

UNITED STATES PATENT OFFICE.

VINCENT A. LAPENTA, OF INDIANAPOLIS, INDIANA.

ELECTROENDOSMOSIS METHOD AND APPARATUS.

Application filed January 22, 1925. Serial No. 3,999.

*To all whom it may concern:*

Be it known that I, VINCENT A. LAPENTA, a citizen of the Kingdom of Italy, residing at Indianapolis, in the county of Marion and State of Indiana, have invented certain new and useful Improvements in Electro-endosmosis Methods and Apparatus, of which the following is a specification.

My invention relates to electro-osmosis method and apparatus as used for the disassociation of binary substances, and more particularly to methods and apparatus of this class in which the substance to be disassociated is made a part of the electrolyte as distinguished from electrolytic apparatus in which the substance to be treated is embodied with one or both of the electrodes for the purpose of decomposing same; and consists substantially in the construction, combination and arrangement of parts hereinafter set forth and pointed out more particularly in the claims.

It is an object of my invention to provide a new and useful electro-endosmosis apparatus by which new and useful methods of electrodialysis; and divers other uses in connection with inorganic, organic and biochemistry may be carried out.

It is a primary object of my invention to provide an electro-osmosis apparatus comprising a cell for the electrolyte substance to be treated, a cell each for the electrodes, and intermediate cells between the substance cell and the electrode cells, all of said cells being communicated by semi-permeable membranes.

Another object of my invention is to provide an osmosis method in which the osmosis process may be carried out thru certain definite stages by impeding the movement of the ions as they are directed to the electrodes for purposes which will be understood.

It is also an object of my invention to construct an apparatus in this manner, in which the gaseous liberation, resulting from the electro-chemical behavior of the ions, may take place, principally in the intermediate cells, thus purifying the electrolyte before it reaches the final state of concentration in the electrode cells.

It is a further object of my invention to construct an electro-osmosis apparatus in this manner, the intermediate cell having draining means by which the electrolyte may be drained off, as desired, while in an intermediate state of disassociation and before the ions have been neutralized by reaching the proximity of the electrodes.

It is a further object of my invention to provide in an electro-endosmosis apparatus, an active solute, separated from the anode and the cathode by a membrane enclosed solvent in which may be placed an adsorbing agent, by which arrangement the velocity of the cation in moving to the cathode and the anion to the anode, is interrupted by definite stages of electrolization, the ions being thus aged while the original solute or electrolyte is freed from the inactive constituents thru adsorbtion and gaseous liberation.

My invention is carried into effect, preferably, by five distinct osmotic cells, arranged in osmotic continuation of each other, said cells being separated preferably by semi-permeable membranes, as understood by those familiar with electro-chemistry. The outer or end cells are preferably of equal size, being adapted to contain electrodes of suitable current intensity and are what I term the direct electrolytic cells, or the electrode cells.

The central cell, I call the osmosis cell, and it is adapted to contain the substance to be electrolizingly treated, as will be more clearly understood. This central cell is preferably equal in cubical contents to the aforesaid electrode cells. Interposed between said osmosis cell and said electrolytic cells are intermediate cells, each of said cells being communicated with the adjacent cell or cells by osmosis membrane means, preferably of semi-permeable character. Said intermediate cells are adapted to serve as adsorbing cells or reaction cells, according to the nature of the particular treatment in process, by which arrangement the electro-positive ions pass to the electro-negative electrode, and the electro-negative ions pass to the electro-positive electrode, and accordingly act to purify themselves while within said adsorbing cells.

I do not consider my invention kindred to apparatus now commonly known, as it differs in function from all such apparatus heretofore used, in the fact that it is not designed for the purpose of manufacturing acids or alkalies, but instead is designed to produce the osmosis separation of what has heretofore been considered electro-disassociatable salts from an organic base, such salts being contained in and harmful to many organic extracts and serums, and correctly termed anti-serums. My invention also differs from apparatus, heretofore used, in the fact that it is not used for the purpose of the synthetic production thru electro-chemical reaction in the making, for example, of sodium carbonate from sodium chloride by bubbling carbonic acid in the negative cell at the cathode while electrolysis is proceeding, as is understood by those familiar with the art. The specific and novel uses of my invention are, instead, confined to the induced electro-osmosis removal of such constituents as are considered impurities in many organic liquids or organic residues, gums, resins, gelatine solutions, normal animal sera, and immune sera, produced against various diseases. Such work is carried out in my invention by causing electrolytic disassociation of these toxic agents, other salts, etc., by which the electro-negative cations of such salts are directed to the cathode and the electro-positive anions, to the anode as will be understood by those familiar with the art.

In operating my apparatus, a suitable adsorbing agent is selected for the particular serum, medicinal plant extract, or the like, such as kaolin, charcoal or mixtures containing other well known adsorbents, such agent being placed in the adsorbing cells, by which the electrolyzing process as above mentioned will cause said agents to adsorb the active elements, the solids being thus reduced by adsorption and disassociation. In certain other instances, by the use of suitable adsorbents it is possible in certain sera, by the use of suitable parchment osmosis membranes, either of animal, vegetable or other origin, to induce in such liquids as may be placed in the cells, a flocculation of the inactive constituents, leaving in solution the active principles, thereby bringing about a purification of the original fluid. This purified liquid can be subsequently concentrated by suitable reagents and again be subjected to treatment as described above, which would remove such reagents from the active concentration, leaving the purified active principles in concentrated form. By thus carrying out a repeated process, extraordinary degrees of purification and concentration of such materials as above mentioned, may be effected.

This is particularly true in instances of anti-serums produced against various diseases, such as diphtheria, scarlatina, streptococcic, pneumococcus infection, etc. In fact, all antisera can be purified and concentrated by the proper use of this apparatus, with suitable reagents and adsorbers.

I have noted in general method that my invention leads directly to the general application above described, wherein by researches as to different adsorbing agents to be used with the different serums or substances desired to be purified, or have their active components removed, the required time being also ascertained by experimenting, whereby new adsorbent should be added upon the corresponding removal of the used adsorbent at suitable intervals due to the maximum saturated state thereof, it being also essential to find by trials the most desirable pressure and flow of electrical current thru the electrolyte by way of the electrodes, by which the specific processes and products derived thereby are considered patentable in themselves, in view of their direct affiliation to my method as an entirety.

Under some conditions it may be preferable to slowly drain from the adsorbent cells somewhat constantly, rather than at intervals, it being understood that the adsorbent valve outlet means should be regulated together with the corresponding inlet means, to feed the adsorbent thru the adsorbent cells at a suitable rate to allow the adsorbent to be saturated with the osmosised ions, which, being thus removed from the electrolyte as a whole, in an electrically charged state, may be then removed from the adsorbent by other processes not described herein.

While the outstanding distinction of my invention lies in the capability of thus definitely diverting the ions in their partially-electrolyzed condition, as above described, the peculiar action of any electrolyte in any or all of my five cells, may be utilized as desired by the operator.

I do not wish to restrict myself to the mere mechanical details for which may be substituted logical equivalents, within the realm of the laboratorian. My methods on the contrary are to be considered new and somewhat independent to the different forms of the apparatus itself, as my mechanical requirements may be considered to reside chiefly in the adsorbent cells which communicate the other cells, it being of course understood that the remainder of the apparatus should have the operatable essentials known to the art, including a source of electrical current suitable for the production of induced electro-endosmosis.

Figure 2:
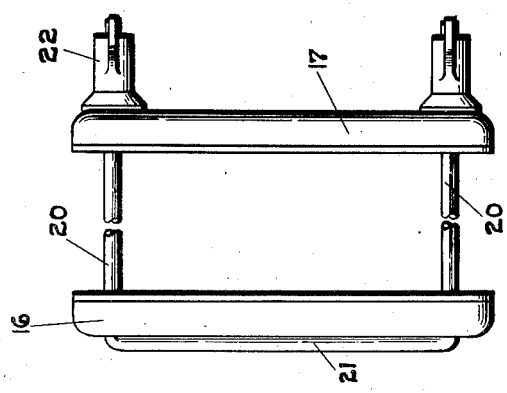

The aforesaid and other objects may be attained by the structure illustrated in the accompanying drawings, in which:

Figure 1 is a partly sectional and fragmentary side elevation, and Fig. 2 is a detailed plan view of the clamping means for clamping the cells together.

Similar characters of reference designate similar parts thruout the several views. Referring to Fig. 1, the numeral 1 designates the base of my invention, upon which is formed the upwardly extending supports 2, near a medial point thereof. Said supports are adapted to removably mount the cell 3, which rests directly thereon, said cell being of cubical character and adapted to be thus supported. This cell is what I call the osmosis cell and is adapted to contain the original or un-treated substances, which is preferably disposed within said cell in combination with distilled water. The ends of said cell are open except for the semi-permeable osmosis membranes 4 and 5, which are stretched across said ends in "drum-head" manner.

The adsorbent cells 6 and 7 correspond in cross section and general character to the osmosis cell 3, being preferably considerably shorter and of correspondingly less cubical capacity. Said adsorbent cells are arranged in end-to-end relationship with said osmosis cell and thus are substantially hollow continuations of same, the membranes 4 and 5 being respectively confined between said adsorbent cells and said osmosis cell. These adsorbent cells 6 and 7 rest on the supports 8 and 9, respectively, which are formed on the base 1, similarly to the supports 2 and are in alignment with same. In like manner the electrode cells 10 and 11 are supported by the similarly constructed supports 12 and 13, and embrace the outer ends of the adsorbent cells 6 and 7, respectively, corresponding in cross section thereto and being substantially hollow continuations thereto. Said electrode cells are preferably of approximately the same cubical capacity each, as the osmosis cell 3, but are open on their inner ends only, being of reclining cup-shaped character, as they form the end cells of the apparatus and therefore are preferably constructed with their outer ends closed.

Confined between the said adsorbent cells and the electrode cells 10 and 11 are the osmosis membranes 14 and 15, it being desirable to have said cells disposed firmly against each other in the above described arrangement, by which the osmosis membranes are held in place, it being understood that said membranes serve as partitions between said cells.

With this in mind, I have provided clamps 16 and 17, which embrace the closed or outer ends of the electrode cells 10 and 11, respectively. Said clamps are supported by merely resting on the locating lugs 18 and 19, respectively, between which the cells are collectively and approximately confined, while said clamps are being applied. The parallel rods 20, connect said clamps, said rods being united in U shaped character by the bar rod 21, by which arrangement said rods are adapted to longitudinally and horizontally straddle the aforesaid cells as an entirety. Said bar rod serves as a common head means for said rod and embraces the outer surface of the clamp 16. In like manner the wing nuts 22 embrace the outer surface of the clamp 17 and engage the free extremities of said rods in threaded relation thereto, by which said cells may be very firmly confined between said clamps and brought tightly together by manipulation of said wing nuts, which are typically adapted to manual or other manipulation. This not only serves to keep the osmosis membranes in position, but serves also to make the water tight junctions between the different cells. Gaskets 23, preferably constructed of resilient waterproof material, are provided to face the adjoining ends of said cells, by which arrangement the membranes are directly confined between said gaskets to make said junctions more nearly water-tight, as will be understood by those familiar with the art.

The electrodes 24 and 25 are suspended within the electrode cells 10 and 11, respectively, thru tubular laboratory stoppers 26 and 27, respectively, said stoppers being disposed thru suitable openings in the upper walls of said electrode cells.

Inlet valve means 28 are provided in the upper portions of the electrode cells thru which the solvent 29 is supplied, and inlet openings 30 are likewise provided in the upper walls of the adsorbent cells 6 and 7 for the purpose of supplying the solvent thereto, together with the adsorbent or reacting agents, as desired. A lid-type opening 31 is also provided in the upper wall of the osmosis cell 3, thru which the solute or original substance may be supplied together with other suitable electrolyte. Outlets valve means 32 are also provided in the lower regions of all of the cells for draining same independently, as desired, suitable openings being formed in the base 1 to clear the tubular extension of said means.

In carrying out the operation of the apparatus, the different cells having been supplied with their proper agents, a direct electrical current is fed thru the electrodes 24 and 25, the electrode 24 being the cathode and the electrode 25 being the anode.

The electrolyzing process being thus begun, salts or other undesirable active agents contained in the solute 33 in cell 3 are directed thru the membranes 4 and 5 into the adsorbent cells 6 and 7, respectively, and thence thru the membranes 14 and 15 into the electrode cells 10 and 11, respectively, the cations being directed to the cathode 24 and the anions to the anode 25, and the solute 33, being thus relieved of its harmful or antiserum elements in ionic form, is rendered more desirable for certain uses. The ions being thus directed thru the membranes 4 and 5 are then impeded in the velocity of their movements by the membranes 14 and 15 which may thus be considered secondary membranes. While the ions are thus being delayed, the adsorbing agents in the adsorbent cells 6 and 7 serve to adsorb large numbers of the passing ions and thus purify the electrolyzed fluid before it reaches the more condensed state in the electrode cells 10 and 11.

Concurrently with this adsorbing process, the gaseous formations in the adsorbent cells may liberate themselves thru the openings 30, hydrogen being thus liberated from the absorbent cell 6 and oxygen from the adsorbent cell 7. It being understood that in some instances adsorbent agents may be omitted in the adsorbent cells, the purifying operation consisting only of gaseous liberation.

The feet 34 are provided on the base 1 for conveniently supporting the apparatus as a whole.

The clamps 16 and 17 are inwardly lined with soft cushion material 35 for resilient contact with the electrode cells 10 and 11, respectively, to protect same from injury.

While I have illustrated in a general way, certain instrumentalities which may be employed in carrying my invention into effect, it is evident that many modifications may be made in the various details, without departing from the scope of the appended claims, it being understood that my invention is not restricted to particular forms, herein described.

The membranes 14 and 4 are preferably an animal membrane, while the membranes 5 and 15 are preferably a vegetable or plant membrane, thereby creating a dielectric phenomena entirely independent of electrolysis, by which I am able to bring about certain flocculation reactions. The peculiar use of the various membranes of different dielectrics depending upon the difference of size of each compartment of the apparatus, together with the resistance afforded by suitable adsorbing agents, makes not only my method novel, but the apparatus as well.

As above mentioned, my intermediate cells 6 and 7 are considerably shorter than my other cells 10, 3 and 11, each being in fact, of about half the cubical contents of each of said other cells. This proportion is necessary to the above mentioned flocculation process.

My invention operates entirely by means of induced electro-endosmosis, the relation between the floating ions taking place without contact with my electrodes. My electrodes do not ionize, being constructed of non-ionizable material, preferably carbon. They do not, therefore, form any part of any ionic product.

I am aware that previous inventions embody electrolysis in the formation of compounds, but my invention is constructed to carry out physico-chemical phenomena by my particular method of induced electro-endosmosis.

Attention is especially called to the fact that most of the work of my invention is carried out by the shifting of the hydrogen ion concentration at various steps, to the desired points, thereby bringing about flocculation of various components due to the attainment of specific iso-electric points of the precipitation, which can be brought about only with the special structure embodied in my apparatus, and with the method employed, which is a new and useful characteristic, as compared to apparatus heretofore used.

I claim as my invention:

1. An electro-osmosis apparatus comprising a cell for electrolyte solute; a cell each for the positive and negative electrodes containing an electrolyte solvent; and intermediate cells between the solute cells and the electrode cells and communicating therewith by osmosis membranes, whereby components of said solute may be osmosised from the first mentioned cells into the intermediate cells and reclaimed in a partly electrolyzed state.

2. An electro-osmosis apparatus comprising a cell for electrolyte solute; a cell each for the positive and negative electrodes containing an electrolyte solvent; intermediate cells between the solute cell and the electrode cells and communicating therewith thru osmosis membranes, whereby components of said solute may be osmosised from the first mentioned cell into the intermediate cells and reclaimed in a partly electrolyzed state; and adsorbing chemical agents disposed within said intermediate cells for the purpose of attracting certain classes of said components for removing same from said apparatus in an active osmosis state.

3. An electro-osmosis apparatus comprising a cell for electrolytic disassociatable substance; a cell for the positive electrode containing an electrolytic solvent; a cell for the negative electrode also containing an electrolytic solvent; and intermediate cells between the substance cells and the electrode cells and communicating therewith thru osmosis membranes, whereby the active ions of said substance may be osmosised from the first mentioned cells into the intermediate cell and chemically handled in a partly electrolyzed state.

4. An electro-endosmosis apparatus comprising a cell for electrolyte solute; a cell each for the positive and negative electrodes containing an electrolyte solvent; and intermediate cells between the solute cells and the electrode cells and communicating therewith thru osmosis membranes, whereby components of said solute may be osmosised from the first mentioned cells into the intermediate cells, for the purpose of impeding the movement of said components in said intermediate cells, as they are directed from the first mentioned cell to the electrode cells, for the purpose of controlling the electrolytic behavior of same, and to permit due time for gaseous liberation, whereby said components are rendered extractable for certain medical or other uses.

5. An electro-osmosis apparatus comprising a cell for electrolyte solute; a cell each for the positive and negative electrodes containing an electrolyte solvent; intermediate cells interposed between the solute cells and the electrode cells and communicating therewith thru osmosis membranes, whereby components of said solute may be osmosised from the first mentioned cells into the intermediate cells and reclaimed in a partly electrolyzed state; and a draining means adapted to regulate the rate of draining of the intermediate cells to correspond with the rate said components are osmosised thereinto.

6. An electro-osmosis apparatus comprising a cell for electrolyte solute; a cell each for the positive and negative electrodes containing an electrolyte solvent; intermediate cells interposed between the solute cell and the electrode cells and communicating therewith thru osmosis membranes, whereby components of said solute may be osmosised from the first mentioned cell into the intermediate cells and reclaimed in a partly electrolyzed state; adsorbing chemical agents disposed within said intermediate cells for the purpose of attracting certain classes of said components for removing same from said apparatus in an active osmosis state; a draining means adapted to regulate the rate of drainage of said intermediate cells, to correspond with the rate of osmosis; and a filling means for supplying new solvent and adsorbent to said intermediate cells, said filling means being adapted to be regulated to correspond with the rate of drainage as affected by the rate of osmosis.

7. An electro-osmosis apparatus comprising a cell for electrolyte solute; a cell each for the positive and negative electrodes containing an electrolyte solvent; intermediate cells interposed between the solute cells and the electrode cells and communicating therewith thru osmosis membranes, whereby components of said solute may be osmosised from the first mentioned cells into the intermediate cells and reclaimed in a partly electrolyzed state; and a draining means adapted to regulate the rate of draining of the intermediate cells and the electrode cells to correspond with the rate said components are omosised thereinto.

8. An electro-osmosis apparatus comprising a cell for electrolyte solute; a cell each for the positive and negative electrodes containing an electrolyte solvent; intermediate cells interposed between the solute cell and the electrode cells and communicating therewith thru osmosis membranes, whereby components of said solute may be osmosised from the first mentioned cell into the intermediate cells and reclaimed in a partly electrolyzed state; adsorbing chemical agents disposed within said intermediate cells for the purpose of attracting certain classes of said components for removing same from said apparatus in an active osmosis state; a draining means adapted to regulate the rate of drainage of said intermediate cells, and said electrode cells to correspond with the rate of osmosis; and a filling means for renewing the respective chemical contents for each of said cells, said filling means being adapted to be regulated to correspond with the rate of drainage as affected by the rate of osmosis.

9. An electro-endosmosis apparatus having an electrolytically active solute separated from the anode and the cathode by an osmosis membrane enclosed solvent containing an ion adsorbing agent, by which the velocity of the cation in moving to the cathode and the anion to the anode is lessened and ascertainable in different stages of electrolyzation for removing the active osmosis solute from the inactive constituents thru ionic absorption and gaseous liberation.

10. An electro-endosmosis apparatus, comprising a solute cell means; intermediate cell means communicating with said solute cell means by way of an osmosis membrane; a solvent cell means containing a positive electrode, and communicating with one of said intermediate cell means by way of an osmosis membrane; another solvent cell means containing a negative electrode said other solvent cell means being communicated with other of said intermediate cell means by way of an osmosis membrane; and a source of electrical current in circuit with said electrodes for successively introducing current thru said cell means by which the solute components are osmosised from the solute cell means toward the solvent cell means thru the intermediate cell means, producing disassociated solute in different states, in the different cell means, respectively.

11. An electro-endosmosis apparatus, comprising a solute cell means; adsorbent cell means communicating with said solute cell means by way of an osmosis membrane; a solvent cell means containing a positive electrode means, and communicating with one of said adsorbent cell means by way of an osmosis membrane; another solvent cell means containing a negative electrode means, said other solvent cell means being communicated with other of said adsorbent cell means by way of an osmosis membrane, and a source of electrical current in circuit with said electrode means for successively introducing current thru all of said cell means by which the solute components are osmosised from the solute cell means toward the solvent cell means thru the adsorbent cell means, producing a disassociated solute in different states, in the different cell means, and adsorbing parts of said solute in the adsorbent cell means, by which said parts are thus extracted from the remainder of the solute.

12. An electro-endosmosis apparatus, comprising a solution cell means; chemical cell means communicating with said solution cell means by way of an osmosis membrane; a solvent cell means containing a positive electrode, and communicating with one of said chemical cell means by way of an osmosis membrane; another solvent cell means containing a negative electrode, said other solvent cell means being communicated with other of said chemical cell means by way of an osmosis membrane, and a source of electrical current in circuit with said electrodes for successively introducing current thru said cell means by which active ions of the solution are osmosised from the solution cell means toward the solvent cell means thru the chemical cell means, whereby said ions may be chemically handled in different stages of electrolization.

13. An electro-endosmosis apparatus, comprising a solute cell means; intermediate cell means communicating with said solute cell means by way of an osmosis membrane; a solvent cell means containing a positive electrode, and communicating with one of said intermediate cell means by way of an osmosis membrane; another solvent cell means containing a negative electrode, said other solvent cell means being communicated with other of said intermediate cell means by way of an osmosis membrane; and a source of electrical current in circuit with said electrodes for successively introducing current thru said cell, by which the solute components are osmosised from the solute cell means toward the solvent cell means thru the intermediate cell means, whereby components of said solute may be osmosised from said solute cell means into the intermediate cell means, for the purpose of reducing the osmotic velocity of said components in said intermediate cells, as they are directed from said solution cell means to the solvent cell means, for the purpose of controlling the electrolytic behavior of same, and to permit ample time for gaseous liberation, whereby said components are rendered extractable in an electro-active state.

14. An electro-endosmosis apparatus, comprising a solute cell means; intermediate cell means communicating with said solute cell means by way of an osmosis membrane; a solvent cell means containing a positive electrode, and communicating with one of said intermediate cell means by way of an osmosis membrane; another solvent cell means containing a negative electrode said other solvent cell means being communicated with other of said intermediate cell means by way of an osmosis membrane; a source of electrical current in circuit with said electrodes for successively introducing current thru said cell means by which the solute components may be osmosised from the solute cell means toward the solvent cell means thru the intermediate cell means, and reclaimed in said intermediate cell means at a partly electrolized stage; and draining means adapted to regulate the rate of draining of the intermediate cells to correspond with the rate at which said components are osmosised.

15. An electro-endosmosis apparatus, comprising a solute cell means; adsorbing cell means communicating with said solute cell means by way of an osmosis membrane; a solvent cell means containing a positive electrode, and communicating with one of said adsorbing cell means by way of an osmosis membrane; another solvent cell means containing a negative electrode, said other solvent cell means being communicated with other of said adsorbent cell means by way of an osmosis membrane; a source of electrical current in circuit with said electrodes for successively introducing current thru all of said cell means by which solute components are osmosised from the solute cell means toward the solvent cell means thru the adsorbing cell means, producing a disassociated solute in different stages, in the different cell means, and adsorbing parts of said solute in the adsorbing cell means by which said parts are thus attracted from the remainder of the solute; a draining means adapted to regulate the rate of drainage of said adsorbing cell means, to correspond with the rate of osmosis; and a filling means for supplying new solvent and adsorbent to said adsorbing cell means, said filling means being adapted to be regulated to correspond with the rate of drainage as affected by the rate of osmosis.

16. The electro-osmosis method of electrolytically directing components of a solution toward the electrodes of an electro-osmosis apparatus, thru a membrane enclosed adsorbent mixture, whereby such components are reclaimed in combination with said adsorbent mixture in a partly electrolized state.

17. The electro-osmosis method of electrolytically directing electro-active parts of a solution toward an electrode of an electro-osmosis apparatus, thru a membrane enclosed cell whereby said ions are reclaimed in a partly electrolized state.

18. The electro-osmosis method of electro-osmosising parts of a solute toward the electro-negative electrode of an electro-osmosis apparatus into a solvent separated from said electrode by an osmosis membrane; and of electro-osmosising other parts of such solute toward the electro-positive electrode of such apparatus into a solvent separated from said electro-positive electrode by an osmosis membrane.

19. The electro-osmosis method of electrolytically directing components of a solution toward the electrodes of an electro-osmosis apparatus, thru a substantially membrane enclosed adsorbent mixture; and of draining said mixture from the apparatus as it is increased in volume by the addition of said components.

20. The electro-osmosis method of electrolytically directing components of a solution toward the electrodes of an electro-osmosis apparatus, thru a substantially membrane enclosed adsorbent mixture; of draining said mixture from the apparatus as it is increased in volume by the addition of said components; and of adding to said mixture as it is thus drained, as effected by the rate of osmosis action.

21. In an electrolytic osmosis apparatus having a solution cell and electrode cells, the method of electro-directing solution components from the solution cell thru an osmosis membrane means, toward the electrode cells, into an adsorbent mixture, said mixture being separated from the electrode cells by osmosis membrane means, whereby flocculation of the inactive components of serums or other analogous liquids may be carried out, leaving still in solution the active components, thereby bringing about a purification of the original solution which is then concentrated by precipitation with suitable reagents and then dissolved in a lesser amount of solvent than originally used and subjected to electrolytic osmosis to remove said reagents, leaving the active principles in solution in a concentrated and purer state.

22. In conjunction with an electrolytic osmosis apparatus having a solution cell means and electrode cell means, the method of electro-directing solution components from the solution cell means thru an osmosis membrane means, toward the electrode cell means into an adsorbent mixture, said mixture being separated from the electrode cell means by osmosis membrane means, whereby such components are reclaimed in combination with said mixture in partially electrolized stage, and subsequently separated therefrom by other means.

23. An electro-osmosis apparatus comprising a cell for electrolyte solute; a cell each for the postive and the negative electrodes containing electrolyte solvents; and intermediate cells between the solute cells and electrode cells, communicating therewith thru osmosis membranes, whereby components of said solute may be osmosised from the solute cells, said intermediate cells being of substantially less cubical capacity than the other cells.

24. An electro-osmosis apparatus comprising a cell for electrolyte solute; a cell each for the cathode and the anode containing an electrolyte solvent; an animal membrane enclosed cell in communication with the cathode cell and the solute cell for osmosising the hydrogen ions; and a vegetable membrane enclosed cell in communication with the anode cell and the solute cell, for osmosising the oxygen ions.

25. An electro-osmosis apparatus comprising a cell for electrolyte solute; a cell each for the positive and the negative electrodes containing electrolyte solvents; and intermediate cells between the solute cells and electrode cells, communicating therewith thru osmosis membranes, whereby components of said solute may be osmosised from the solute cells, said intermediate cells being of substantially half the cubical capacity of the other cells.

In testimony whereof, I have hereunto set my hand on this the 16th day of January, 1925, A. D.

VINCENT A. LAPENTA.

Witnesses:
 Louis Schweizer,
 Mary C. Spencer.